United States Patent
Vishnubhatta et al.

(10) Patent No.: US 9,613,326 B2
(45) Date of Patent: Apr. 4, 2017

(54) METHOD AND SYSTEM FOR FILTERING COMMON FIELDS ACROSS MULTIPLE DATA SETS

(75) Inventors: Srinivas Vishnubhatta, San Francisco, CA (US); Eric Nash, San Fransisco, CA (US); Guillaume Le Stum, San Francisco, CA (US); Stefan Eberl, San Francisco, CA (US); Siuling Ku, Alameda, CA (US)

(73) Assignee: salesforce.com, inc., San Francisco, CA (US)

(*) Notice: Subject to any disclaimer, the term of this patent is extended or adjusted under 35 U.S.C. 154(b) by 240 days.

(21) Appl. No.: 13/556,975

(22) Filed: Jul. 24, 2012

(65) Prior Publication Data

US 2013/0031499 A1    Jan. 31, 2013

Related U.S. Application Data

(60) Provisional application No. 61/511,756, filed on Jul. 26, 2011.

(51) Int. Cl.
*G06F 17/30* (2006.01)
*G06F 3/048* (2013.01)
*G06Q 10/06* (2012.01)
*G06Q 10/08* (2012.01)

(52) U.S. Cl.
CPC .......... *G06Q 10/06* (2013.01); *G06Q 10/08* (2013.01)

(58) Field of Classification Search
CPC ................ G06F 17/30389; G06F 17/30607
USPC .................. 715/765, 764; 707/754, 758
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,613,110 A | * 3/1997 | Stuart | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |

(Continued)

*Primary Examiner* — Hung T Vy

(74) *Attorney, Agent, or Firm* — Dergosits & Noah LLP; Todd A. Noah

(57) ABSTRACT

A system and method for display of graphical components on a user interface. Multiple components may be displayed on a graphical user interface an active dashboard. Each component is a graphical representation of a report generated from plurality of data fields stored in objects on a database. At least some of the reports are generated from different data models. The displayed components are filtered on the basis of at least one data field that is a common field among the different data models.

17 Claims, 15 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,047,180 B1 * | 5/2006 | Mathews et al. ............... 703/27 |
| 7,062,502 B1 | 6/2006 | Kesler |
| 7,340,411 B2 | 3/2008 | Cook |
| 7,401,094 B1 | 7/2008 | Kesler |
| 7,464,386 B2 * | 12/2008 | Millington et al. .......... 719/331 |
| 7,620,655 B2 | 11/2009 | Larsson |
| 7,698,160 B2 | 4/2010 | Beaven et al. |
| 7,945,584 B2 * | 5/2011 | Bedell et al. ................ 707/779 |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 8,341,163 B2 * | 12/2012 | Folting et al. ................ 707/754 |
| 2001/0044791 A1 | 11/2001 | Richter et al. |
| 2002/0032687 A1 * | 3/2002 | Huff .......................... 707/104.1 |
| 2002/0038228 A1 * | 3/2002 | Waldorf ................. G06Q 10/06 705/7.37 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0260492 A1 * | 11/2007 | Feied et al. ...................... 705/3 |
| 2009/0006318 A1 * | 1/2009 | Lehtipalo .......... G06F 17/30554 |
| 2009/0063415 A1 | 3/2009 | Chatfield et al. |
| 2009/0313250 A1 * | 12/2009 | Folting et al. .................... 707/7 |

* cited by examiner

400

| User_id /401 | Org_id /402 | Obj_id /403a | ... | Obj_id /403n |
|---|---|---|---|---|
| U234 | E33 | O37 |  | D3 |
| U87 | E68 | O241 | ... | D22 |
| U45 | E105 | O122 |  | D37 |
| ⋮ | ⋮ | ⋮ |  |  |

*FIG. 4A*
*User Subscription Table*

410

| Dash_id /411 | Dash_name /412 | Dash_Descrip /413 | Comp_id_link /414 |
|---|---|---|---|
| D3 | Performance | Accounts, Cases | C45, C86, C124 |
| D22 |  |  |  |
| D37 | ⋮ | ⋮ | ⋮ |
| ⋮ |  |  |  |

*FIG. 4B*
*Dashboard Table*

420

| Comp_id | Comp_name | Comp_title | Dash_id | Report_id |
|---|---|---|---|---|
| C45 | Critical Cases | Service calls | D3 | R2 |
| C86 | Account Activity | YTD Sales | D3 | R7 |
| C124 | Cases | New Leads | D3 | R11 |
| ⋮ | ⋮ | ⋮ | ⋮ | ⋮ |

421, 422, 423, 424, 425

FIG. 4C
*Component Table*

430

| Report_id | Rep_name | Obj_id | Obj_fields | Rep_value |
|---|---|---|---|---|
| R2 | B-Report | O37 | F3, F7 … | U3, U7 … |
| R7 | G-Report | O241 | F22, F60 … | W1, W2 … |
| R11 | K-Report | O122 | F5, F15 … | X11 … |
| ⋮ | ⋮ | ⋮ | ⋮ | ⋮ |

431, 432, 433, 434, 435

FIG. 4D
*Report Table*

METHOD AND SYSTEM FOR FILTERING COMMON FIELDS ACROSS MULTIPLE DATA SETS

PRIORITY CLAIM

The present application claims the benefit of U.S. Provisional Patent App. No. 61/511,756, filed on Jul. 26, 2011, entitled "Method and System for Providing Deduplication and Representation of Common Fields Across Multiple Data Sets", which is incorporated herein by reference in its entirety.

COPYRIGHT NOTICE

Portions of this disclosure contain material which is subject to copyright protection. The copyright owner has no objection to the facsimile reproduction by anyone of the patent document or the patent disclosure, as it appears in the records of the United States Patent and Trademark Office, but otherwise reserves all copyright rights whatsoever.

TECHNICAL FIELD

This disclosure relates generally to systems, computer program products, and computer methods for displaying performance metrics on a dashboard interface, and more particularly, to providing a filter for the dashboard interface.

BACKGROUND

An ongoing business enterprise uses and maintains data related to the company's business, such as sales numbers, customers, business opportunities, and other information pertinent to sales, revenue, inventory, networking, etc. The data is stored on a database that is accessible to company employees, and frequently, a third party maintains the database containing the data. For example, the database can be a multi-tenant database, which maintains data and provides access to the data for a number of different companies.

To facilitate effective use of data, many business organizations have a system to help manage the company's interactions with customers, clients and sales prospects, commonly known as a customer relationship management (CRM) system. A CRM system may provide various mechanisms for reporting and viewing data, such as a "dashboard," which is a specialized graphical user interface (GUI) that provides visualization of data, particularly performance metrics. A dashboard typically contains one or more components, each of which represents information of significant analytical value to the user. A dashboard can combine information from multiple and often disparate data sets, which makes it difficult to filter information that is presented on the dashboard. Thus, known solutions may filter a few components, and usually only if the components come from the same data set. The problem is that users rarely know which components are filtered thus creating some ambiguity about the information displayed on the dashboard.

Therefore, it would be desirable to provide systems and methods that overcome the above and other problems relating to facilitating the analysis of shared information to improve networking across a database system maintained on an external server, such as a multi-tenant database.

BRIEF DESCRIPTION OF THE DRAWINGS

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

Although the following figures depict various examples of the invention, the invention is not limited to the examples depicted in the figures.

FIG. 4A illustrates a database table/record storing a list of user subscription data;

FIG. 4B illustrates a database table/record storing a list of dashboards;

FIG. 4C illustrates a database table/record storing a list of components used in dashboards;

FIG. 4D illustrates a database table/record storing a list of reports;

DETAILED DESCRIPTION

This disclosure describes systems and methods for global filtering of all components displayed on a dashboard application. Dashboard applications are used primarily to provide visualization of key performance indicators for an enterprise. Each component is sourced by a report that includes a plurality of data fields stored in objects on a database. At least some of the reports are generated from different data models. The displayed components are filtered on the basis of a common field among the different data models.

A user may be presented with a list of available choices for the common field filter. A method for determining which fields are common is described, wherein the underlying report for each component is identified. The base objects in each report are then evaluated, and a list of common base objects across all the reports is generated. Each of the common base objects includes a plurality of data fields that include data, or link to other fields, reports or objects. Any of these data fields that map to each and every report that underlies the active dashboard is considered a common field and may be selected as a basis for a global filter.

1. Hardware/Software Environment

As used herein, the term multi-tenant database system refers to those systems in which various elements of hardware and software of the database system may be shared by one or more customers. As used herein, the term query refers to a set of steps used to access information stored in a database system.

Figure 1:
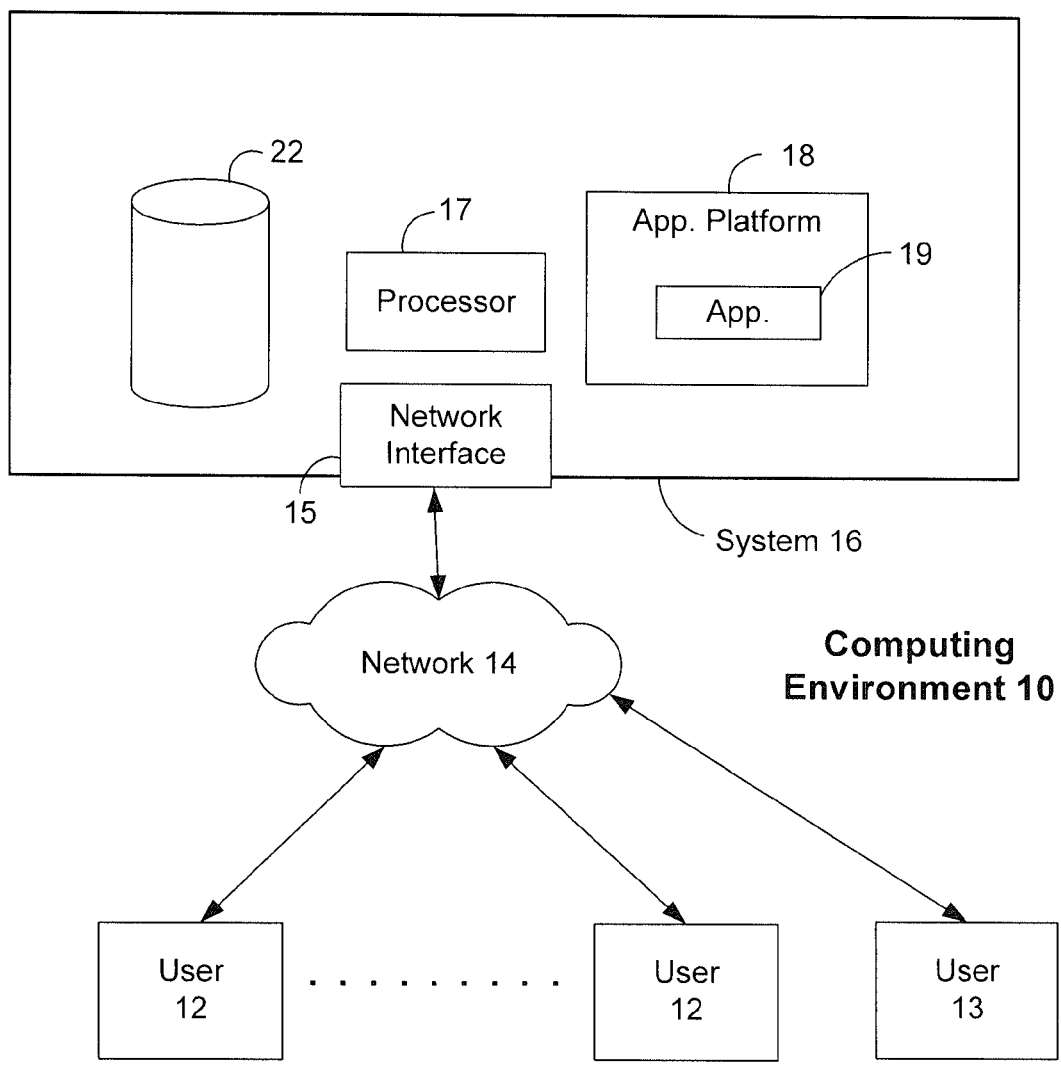
FIG. 1 is a simplified block diagram illustrating one embodiment of a multi-tenant database system ("MTS")

FIG. 1 is a simplified block diagram illustrating one embodiment of an on-demand, multi-tenant database system ("MTS") 16 operating within a computing environment 10. User devices or systems 12, 13 access and communicate with MTS 16 through network 14 in a known manner. User devices 12, 13 may be any computing device, such as a desktop computer, laptop computer, digital cellular telephone, or any other processor-based user device, and network 14 may be any type of computing network, such as a local area network (LAN), wide area network (WAN), the Internet, etc. As described in more detail below, user device 13 may be configured with a dashboard application, i.e., a graphical user interface on a computing device that displays components in order to visualize data or metrics. Dashboard applications are generally known as software tools for providing visualization of data, and the systems and methods described herein are useful to provide filtering mechanisms for data displayed in a dashboard application.

The operation of MTS 16 is controlled by a processor 17, and network interface 15 manages inbound and outbound communications between the network 14 and the MTS. One or more applications 19 are managed and operated by the MTS 16 through application platform 18. For example, a database management application runs on application platform 18 and provides program instructions executed by the processor 17 for indexing, accessing and storing information for the database. In addition, a number of methods are described herein which may be incorporated, preferably as software routines, into the database management application.

MTS 16 provides the users of user systems 12, 13 with managed access to many features and applications, including tenant data storage 22, which is configured through the MTS to maintain tenant data for multiple users/tenants. The tenant storage 22 and other processor resources may be available locally within system 16 as shown, or hosted remotely with high speed access.

Figure 2A:
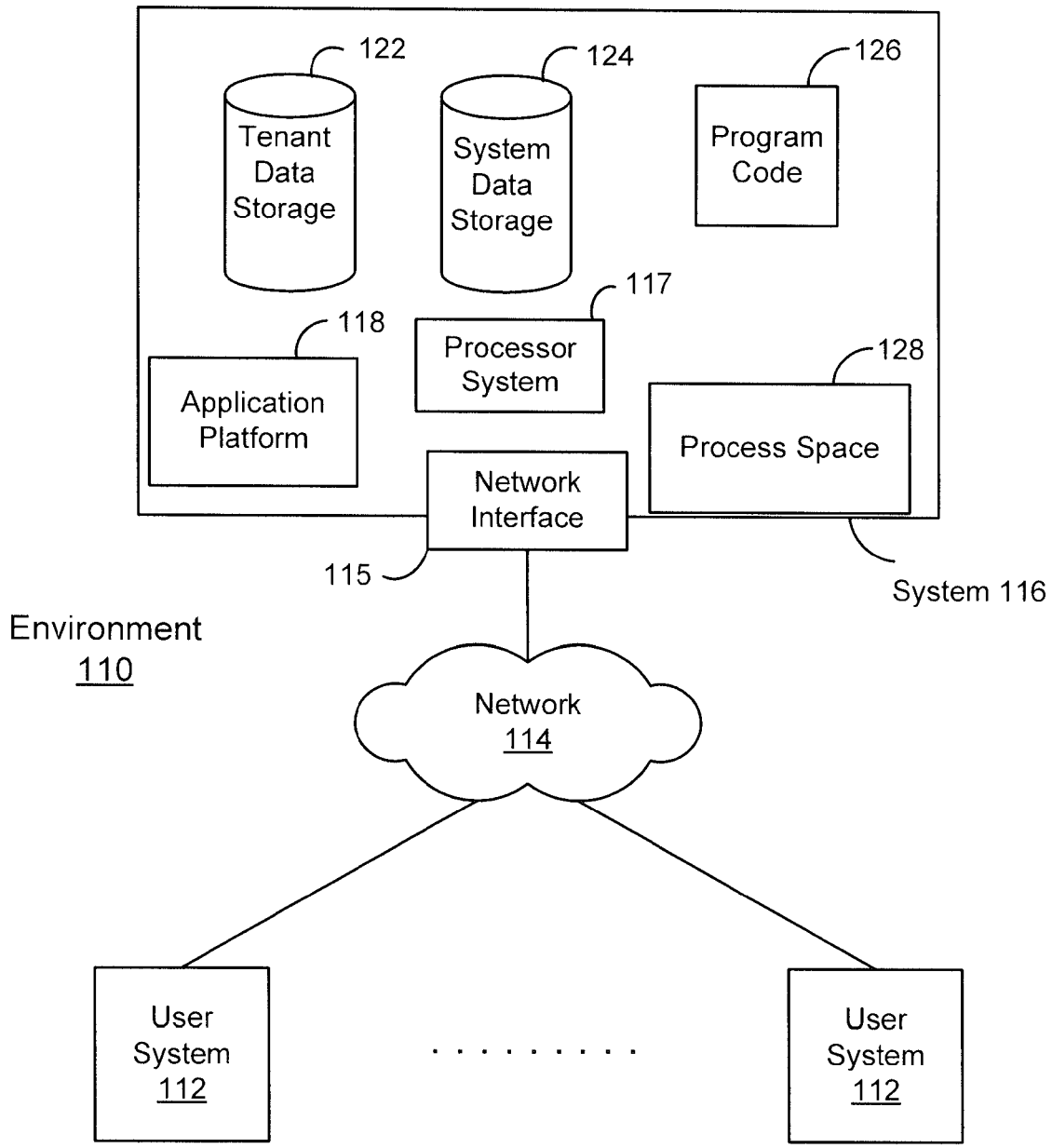
FIG. 2A is a block diagram illustrating an example of an environment wherein an on-demand database service might be used.

FIG. 2A is a more detailed block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 2A (and in more detail in FIG. 2B), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

Figure 2B:
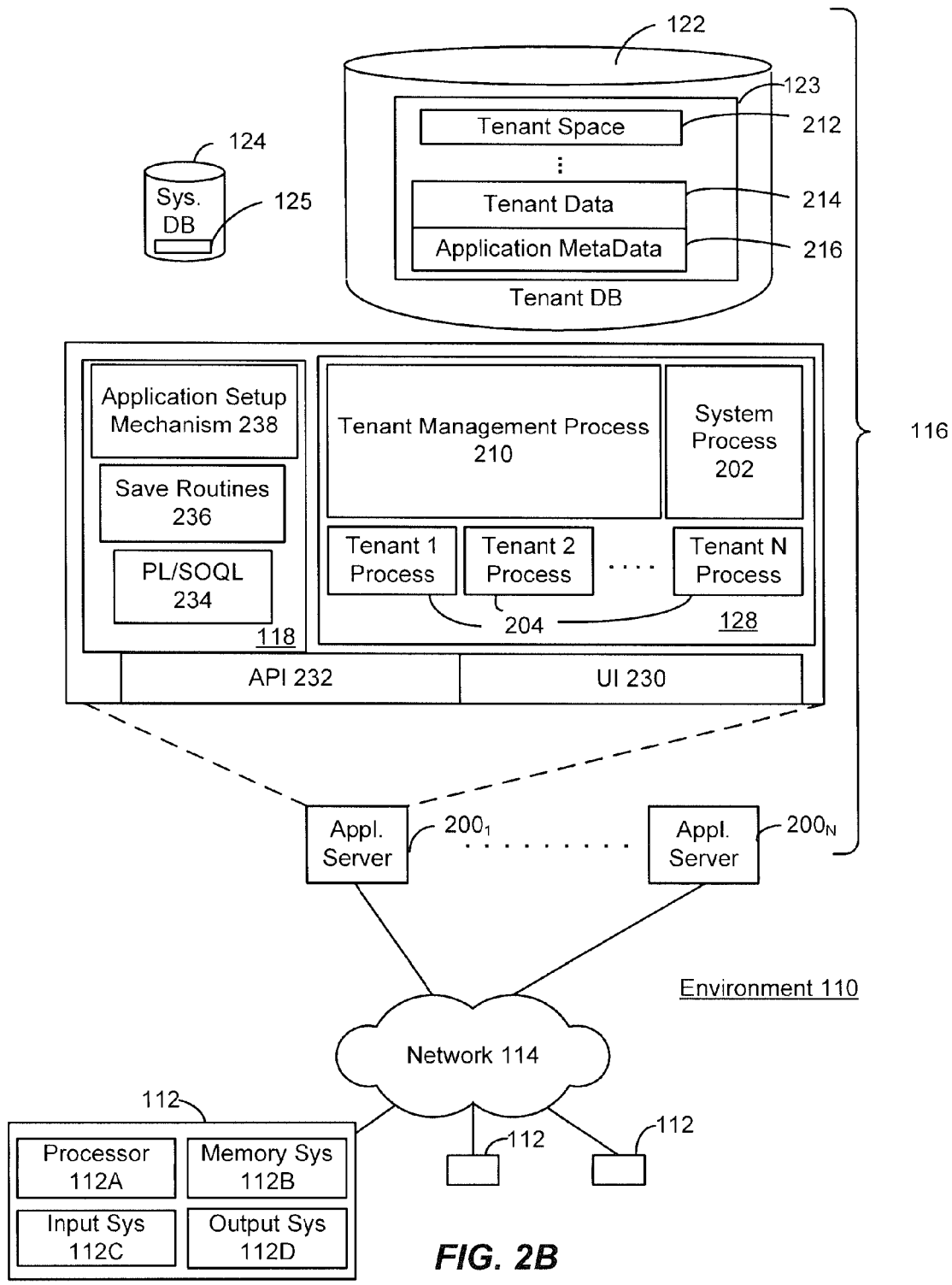
FIG. 2B is a block diagram illustrating an embodiment of elements of FIG. 2A and various possible interconnections between those elements;\

One arrangement for elements of system 116 is shown in FIG. 2B, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 2A include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
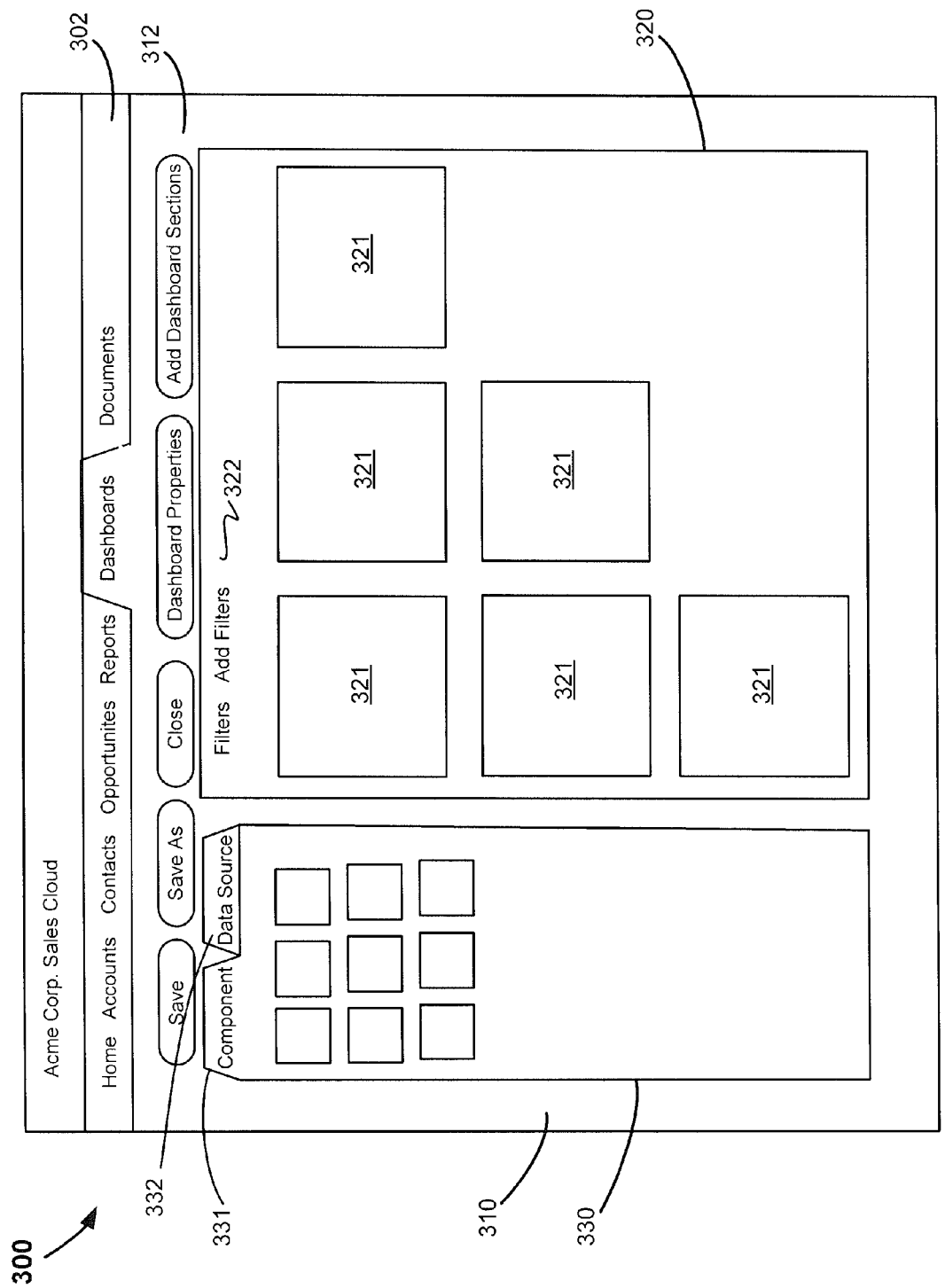
FIG. 3 is a representative screen shot showing a dashboard application.

FIG. 2B also illustrates environment 110. However, in FIG. 2B elements of system 116 and various interconnections in an embodiment are further illustrated. FIG. 2B shows that user system 112 may include processor system 112, memory system 113, input system 112C, and output system 112D. FIG. 3 shows network 114 and system 116. FIG. 2B also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 2A. Regarding user system 112, processor system 112 may be any combination of one or more processors. Memory system 113 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 2B, system 116 may include a network interface 115 (of FIG. 2) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that the terms "table" and "object" may be used interchangeably herein. Each table generally contains one or more data categories logically arranged as columns or fields in a viewable schema, such as illustrated in FIGS. 4A-4D and described below. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with the terms "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

2. Dashboard Applications

Tenants or subscribers of MTS 16 may invoke dashboard applications in order to visualize and evaluate data, such as key performance indicators (KPI's) for the enterprise. A "dashboard" is a computer-implemented graphical user interface presenting one or more components as visual representations on a display. In a typical application, each component represents some KPI. The components are typically metrics defined in a graphical format by a database user for an enterprise, such as a business having sales, marketing, operations, etc. A graphical metric can include, for example, a table, graph, plot, gauge, chart, or any other visual display of statistical data produced by an aggregation of data across one or more fields in a selection of records from a database like MTS 16. Configuration of dashboard applications is generally known and will therefore not be described in great detail herein.

FIG. 3 is a simplified illustration of a screen shot from a computer display showing one example of a graphical user interface 300, in which a dashboard 310 is rendered on the display, such as user device 13. The dashboard 310 is selected or created by a user for display on user interface 300 in a known manner, for example, by choosing a Dashboards command which has been configured on interface toolbar 302 to thereby reveal the Dashboard tab. The interface toolbar 302 may be configured include other interface commands, such as Home, Accounts, Contacts, Opportunities, Reports, Documents, as shown in the figure, or any other desired interface-level commands, to provide other desirable user interfaces.

The illustrated dashboard 310 includes three main parts: a dashboard toolbar 312 configured with command buttons related to dashboard control/operations, such as Save, Save As, Close, Dashboard Properties, Add Dashboard Sections, as illustrated; a dashboard visualization panel 320 for displaying components; and a component configuration panel 330 including one tabbed page 331 labeled Components (shown) and another tabbed page 332 labeled Data Sources (hidden).

A user may assemble dashboard 310 by dragging and dropping components from the Component page 331 into the dashboard visualization panel 320. The user may also be presented with a list (not shown) of existing dashboards to which the user has access rights to view the dashboards. A data source may be associated with each component dropped onto the dashboard by selecting a report from the Data Source page 332 and dragging it onto the component to thereby have the report feed data to the component. The user can also define or redefine properties of components using the Dashboard Properties button on toolbar 312, or add new components using the Add Dashboard Sections button on toolbar 312.

As illustrated in FIG. 3, the visualization panel 320 of dashboard 310 displays a number of active dashboard components 321. Each dashboard component is driven by a report stored in the database, where the report feeds data to the dashboard component. Each report may also have multiple data fields, where each field is related to a base object stored on the database, as further described below.

There are typically many different reports available on the database, and some reports may be created from different data models. In addition, different entities may have different data models, each model created to suit the needs of the particular entity. For example, there may be different data models for sales, marketing, manufacturing, and distribution organizations within the same company. Further, although reports from different data models may reference the same underlying object(s) in the database, such as an Account object, there may be different labels attached to the same object in different reports and/or different data models. Also, rather than reference the same objects, reports may reference different but equivalent objects, which may also have different labels.

The organization of different data models has prevented known dashboard applications from providing a global filtering function, i.e., a single filter that may be applied over all displayed dashboard components. However, by identifying common fields or equivalent fields in the reports that underlie the displayed components, a global dashboard filter may be provided. To that end, the dashboard visualization panel 320 also includes a command toolbar 322 above the displayed components that provides two commands, Filter and Add Filter, and further described in Section 4 below.

3. Objects, Records and Fields

A multi-tenant database is comprised of a number of entities, or objects, that represent tables containing the information of one or more organizations. Each entity may have related child objects that define the entity. For example, a common business object represents Accounts, such as customers, partners and competitors, and may have related child objects including one or more data feeds. Both the entity object (also called the base object) and its child objects have records associated with them which may include data defining the object as well as one or more data fields having values or links which are referenced in operations involving the object.

The objects are typically accessible through an application programming interface (API), which is provided through a software application, such as a customer relationship management (CRM) software product, such as Salesforce CRM. The term "record" is used to describe a specific instance of an object, like a specific customer account that is represented by an account object. A record may be thought of as simply a row in a database table. In a typical database application, standard objects may be provided, while custom objects may be created by the user.

It should also be noted that users may only access objects for which they have authorization, as determined by the organization configuration, user permissions and access settings, data sharing model, and/or other factors related specifically to the system and its objects. For example, users of the database can subscribe to one or more objects on the database in order to access, create and update records related to the objects, including data feeds or dashboard applications.

In one embodiment, the database may maintain a user subscription table 400, as shown in FIG. 4A, that provides a list of all objects to which a user has access, e.g., the user is subscribed and/or authorized for these objects. In subscription table 400, the first column 401 is a list of users identified by user_id, the second column 402 is a list of organizations associated with respective users in the first column and identified by org_id, and columns 403a through 403n list objects to which the listed user is subscribed and identified by a respective obj_id. The records for the objects identified in columns 403a-403n may further identify specific fields and/or other related records.

One of the objects subscribed to by a user may be a dashboard application. For example, the first row shown in table 4 shows that user U234 is subscribed to object D3 in column 403b, which is a dashboard. The dashboard object D3 may have related records and related child objects, all of which can be referenced through use of the dashboard object.

The database may thus also maintain a dashboard table 410 as shown in FIG. 4B. Each dashboard has an object created on the database to represent the dashboard, where the features of the dashboard are stored in a record associated with the dashboard object. Each time a dashboard is created, the database assigns an identifier dash_id as shown in the first column 411 and allocates a row to that dashboard in the dashboard table 410. Fields are created and stored with the table 410 to include identifying features, such as the name of the dashboard dash_name in column 412, and a description of the contents dash_descrip in column 413. As components are added to the dashboard, a link to each component comp_link is added to column 414 of table 410. The links point to a component table 420, as shown in FIG. 4C, which is a record that defines each component. Additional columns of links or other information may be defined.

In FIG. 4C, the first column 421 contains a component identifier comp_id that is assigned by the database, and which is used in field 414 of dashboard table 410 to reference and call the related records and values associated with that component when the component is generated as part of a dashboard rendered in a user interface. The component table 420 also includes a field 422 for the name of the component comp_name and a field 423 for a description of the component comp_descrip. The component table 420 further includes field 424 listing the dashboard dash_id with which the component is associated, and field 425 references a report report_id that produces values for the component.

The reports are maintained in tables, such as table 430 in FIG. 4D. The first column 431 includes the report_id that was referenced in column 425 of component table 420 in FIG. 4C. Other columns are defined with descriptive fields and links to objects, data, etc. Column 432 contains the Report Name, and column 433 identifies the object on the database that stores the report identified in each row. Column 434 identifies the fields associated with the object in column 433, and column 435 provides one or more report values.

It should be noted that table 430 is indicative of a particular data model; that is, the organization of the report is defined by the identification of data and links within a row of the table. However, other report tables may be organized in a different manner to suit the needs of a particular organizational entity. It is this different organization of report tables that has hindered efforts to provide global filters for dashboard application. Nevertheless, each report may reference many of the same base objects, fields and links. By drilling down into each report and finding which base objects are referenced in a particular report, a set of common objects can be determined. For example, each row of column 433 of table 430 contains a specific reference to a base object, and each corresponding row of column 434 of table 430 contains a specific identification of fields that are contained on the base object in that row. Thus, by examining the underlying report table for each displayed component, common objects and common fields may be identified and used as the basis for global filtering of all components displayed on the active dashboard.

4. Filtering Dashboard Applications

Figure 5A:
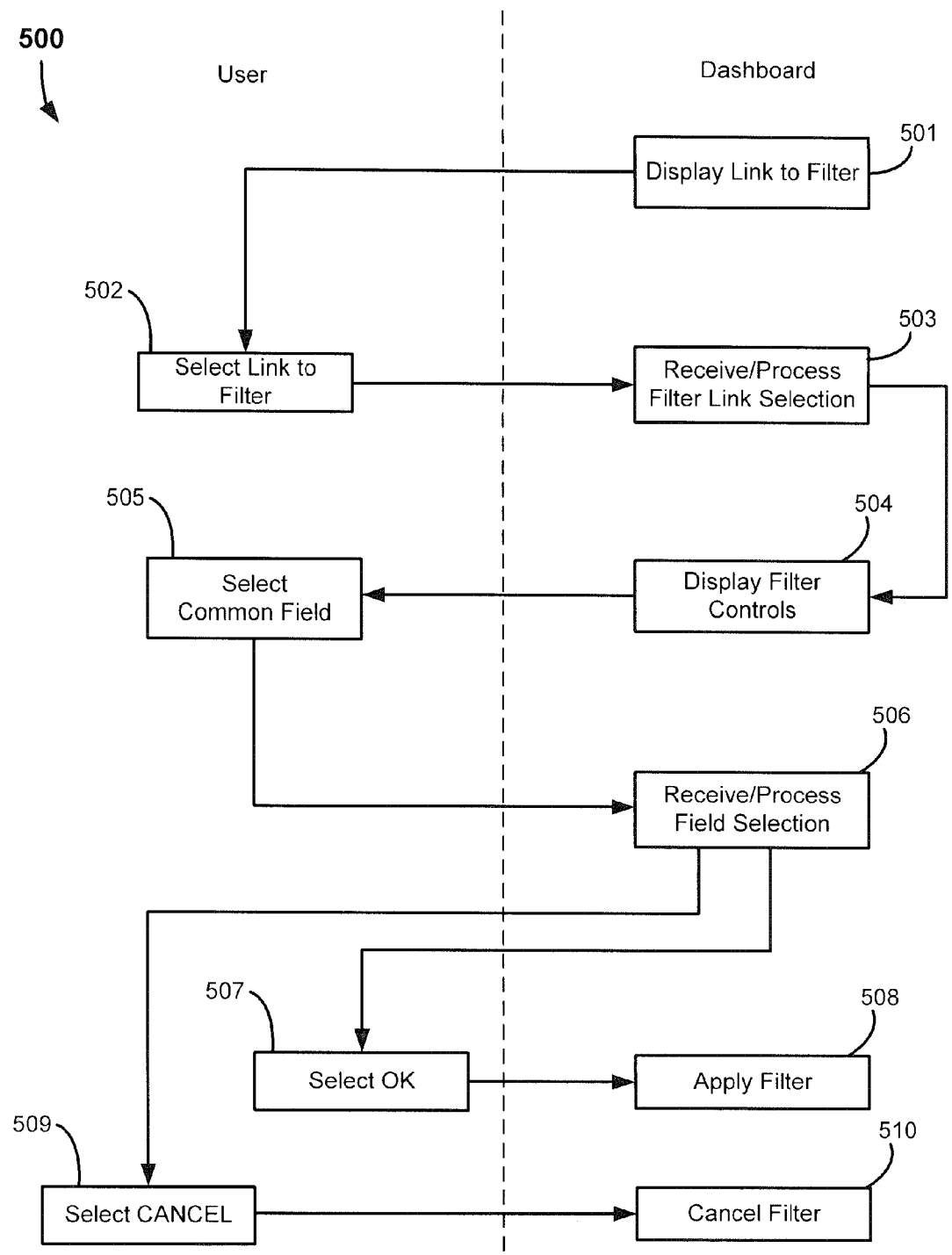
FIG. 5A is a flowchart illustrating a method for applying a filter to a dashboard in a database system.

One embodiment of a process 500 for providing a filter overlay for a dashboard application is shown in FIG. 5A. Process 500 represents an interaction between a user and a dashboard application. The filter process is made available when the user has an active dashboard displayed with multiple components, and allows users to see different views of the dashboard data through filters that are common to all components on the active dashboard.

In step 501, a link is displayed on the user interface for invoking a routine to configure the filter, such as the Add Filter command displayed on toolbar 322 in FIG. 3. In step 502, the user selects the link, and that user selection is received and processed by the database system in step 503. The system then presents a dialog box to the user in step 504 with controls for configuring the filter, for example, as a pop-up window on the user interface (see FIGS. 6A-6C). At a minimum, the filter pop-up window includes at least one data box for allowing the user to select a data field to be the basis of the filter. Further, the system may populate the data box with a list of fields available for user selection. In one embodiment, only common fields may be selected as the filter basis, i.e., fields that are common across all data models that are represented by the various components on the active dashboard.

In step 505, the user selects a data field to be the filter overlay on the active dashboard. For example, the user may wish to display results that are filtered to show sales-related metrics by region, or by division, or by industry. As noted above, in one embodiment, only common fields are available for selection as filters. Methods for determining the common fields are described in more detail below. In step 506, the database system receives and processes the user's selection of a common field as the basis for the filter.

In this embodiment, the filter may be applied after a common field is selected. If the user selects the OK button in step 507, then the filter is applied in step 508. If instead the user selects the CANCEL button in step 509, then the filter operation is cancelled in step 510.

Figure 5B:
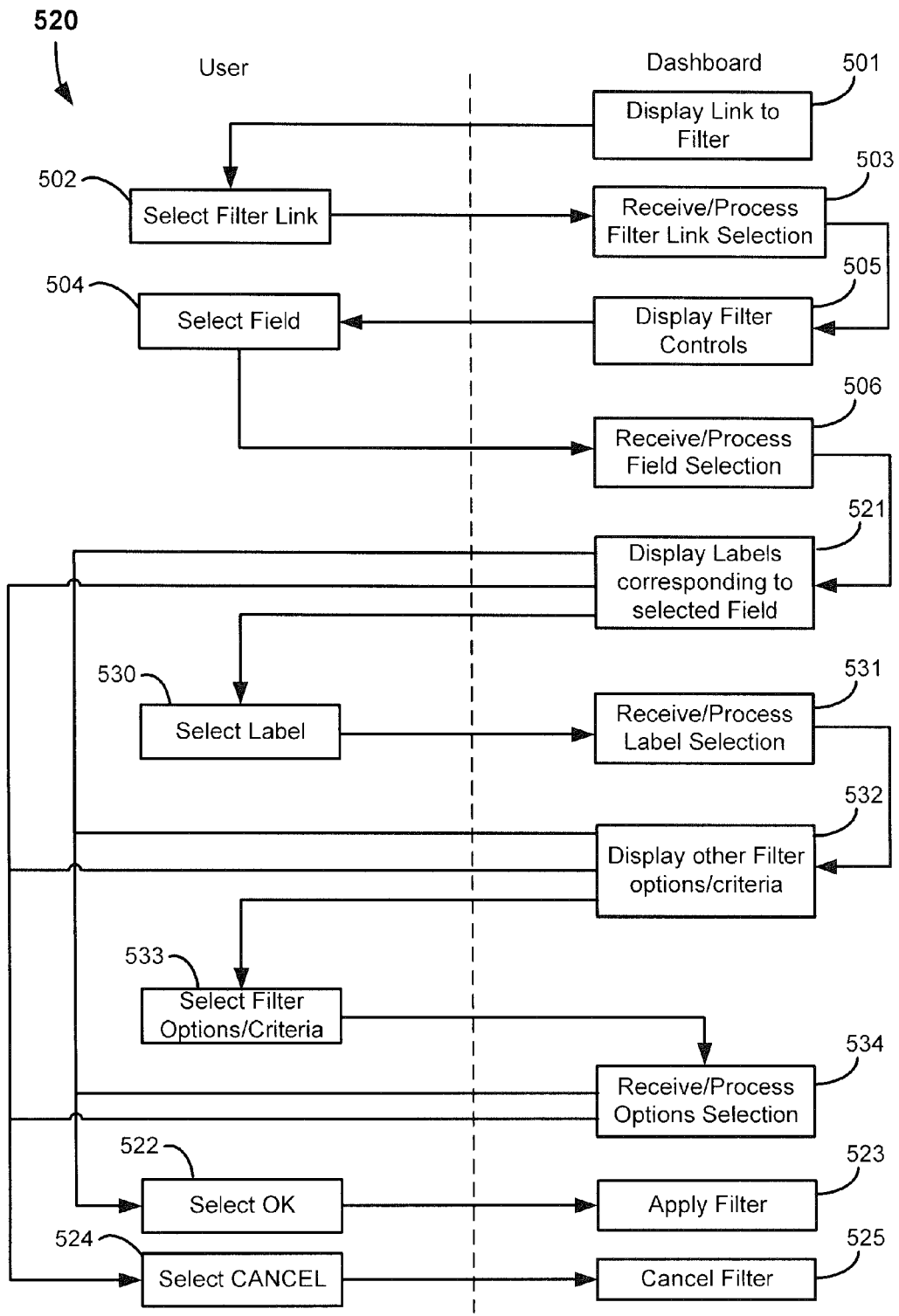
FIG. 5B is a flowchart illustrating an alternative method for applying a filter to a dashboard in a database system.

Another process 520 for providing a filter overlay for a dashboard application is shown in FIG. 5B. Steps 501 through 506 are the same as on FIG. 5A, but after receiving the user's selection of a common field in step 506, the system proceeds to display one or more labels that correspond to the selected field in step 521. There may be different labels associated with a common field in different data models. In one embodiment, all labels associated with the common field may be displayed so that the user may choose, and preferably, duplicate entries are removed.

At this point, the user may select one of three options. The user may choose to apply the filter based on the selected common field by clicking the OK button in step 522 (even without choosing a label), and the filter will be applied by the system in step 523. Likewise, the user may also cancel the filter operation by selecting the CANCEL button in step 524, thus cancelling the filter operation in step 525. Alternatively, the user may provide additional information for the filter operation by associating a label with the selected common field and/or establishing additional criteria to be applied in the specified filter operation.

In step 530, the user chooses a label for the selected common field, and in step 531, the database system receives and processes the user selection thereby associating the selected label with the selected field for the purpose of this filter configuration.

In step 532, the system displays additional options or criteria for the filter operation, and an embodiment for doing so is described below. And once again, the user may select one of three options. The user may choose to ignore the additional options feature and simply apply the filter based on the selected common field with selected label by clicking the OK button in step 522, and the filter is applied in step 523. The user may also cancel the filter operation by selecting the CANCEL button in step 524 thus cancelling the filter operation in step 525. The user may instead proceed to configure additional options and/or criteria for the filter operation.

In step 533, the user selects and/or enters options and/or criteria to be applied with the filter, and in step 534, these options and/or criteria are received and processed by the system.

Finally, the user must decide to apply the filter by selecting OK in step 522 or cancelling the operation by selecting the CANCEL button in step 524. Upon receiving the user's selection of OK, the system applies the filter to all components displayed on the active dashboard, and saves the filter.

Figure 6A:
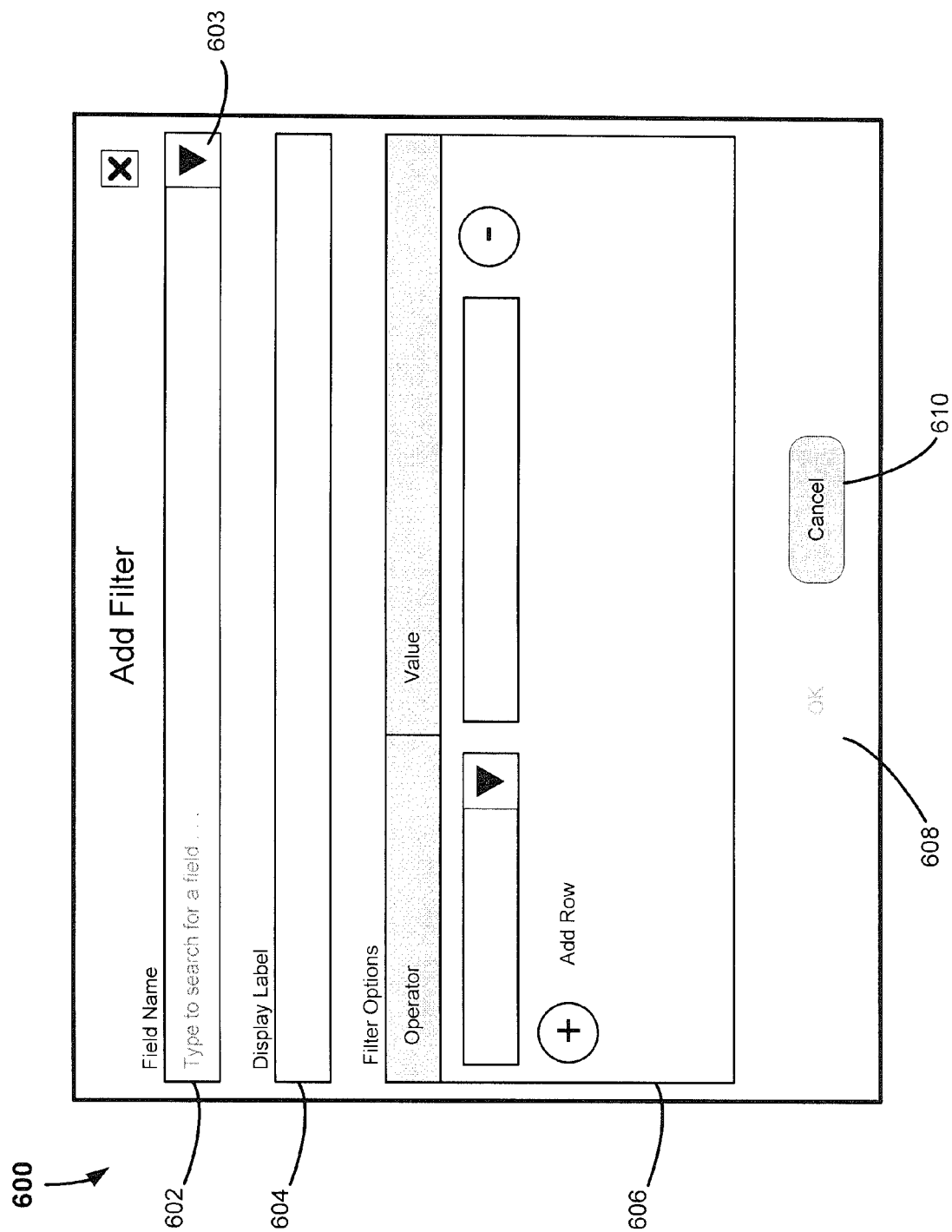
FIG. 6A is a representative screen shot showing a filter overlay window.

The following example illustrates one possible implementation of the method described above as a filter overlay for a dashboard application. As noted above, when the user selects the Add Filter command from dashboard toolbar 322 (see FIG. 3), a new window 600 pops up as shown in FIG. 6A, to provide a dialog box for user input to configure the filter operation. The exemplary dialog window 600 is configured with three data boxes, namely data box 602 (Field Name), data box 604 (Display Label) and data box 606 (Filter Operations), and two control buttons, e.g., button 608 (OK) and button 610 (Cancel). Data box 602 is single text buffer, e.g., 40 character maximum, for the user to enter and/or select a Field Name to be the basis for the filter function. Data box 604 automatically displays one or more Labels corresponding to the Field Name entered or selected by the user in box 602. Data box 606 allows the user to configure additional options.

Figure 6B:
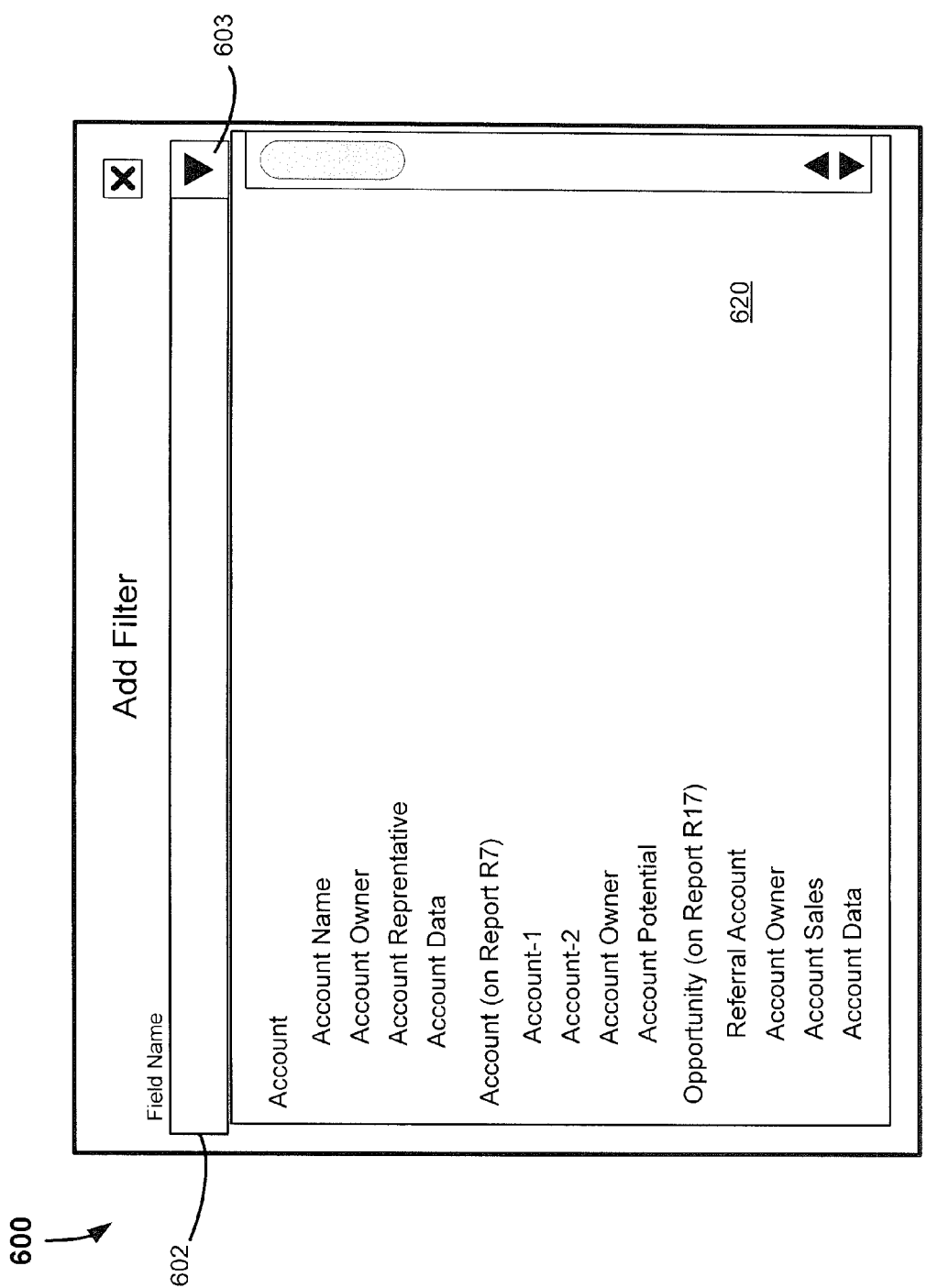
FIG. 6B shows an expanded field from the screen shot of FIG. 6A.

The user may begin to enter text into field 602 and automatically invoke a search function on the entered text to locate a match among a list of common fields. Alternatively, the user may select from a pull-down menu showing available fields to choose from by selecting pull-down arrow 603. For example, FIG. 6B shows a pull-down menu 620 that is expanded from field 602 when pull-down arrow 603 is selected. The pull-down menu 620 lists all common fields from each report that underlies the dashboard under its corresponding object. Advantageously, the list may include duplicate fields if there are different report types, different fields, or different labels, and likewise, duplicate fields may be removed where there is the same field or label associated with reports.

Figure 6C:
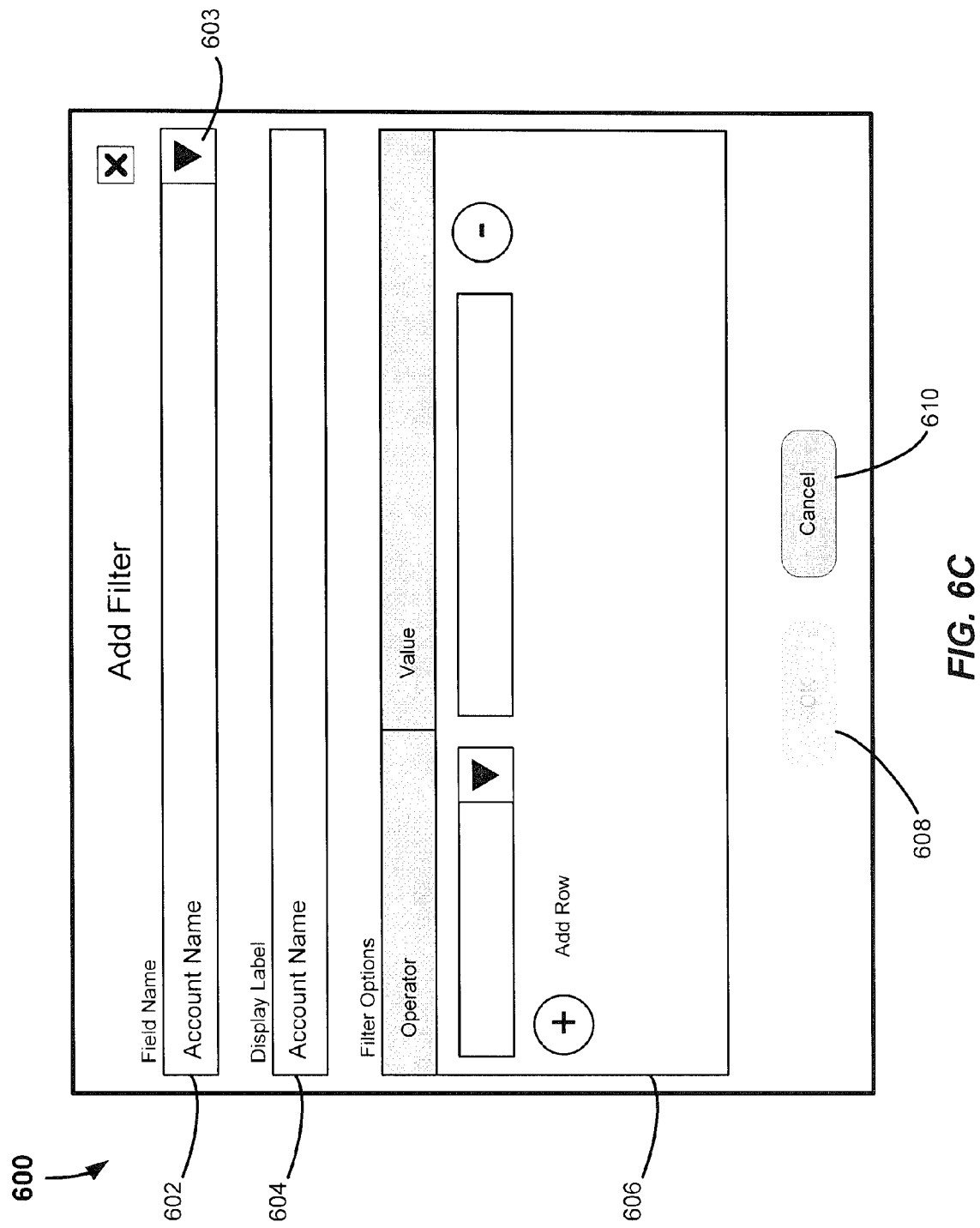
FIG. 6C shows other field operations on the screen shot of FIG. 6A.
Figure 6D:
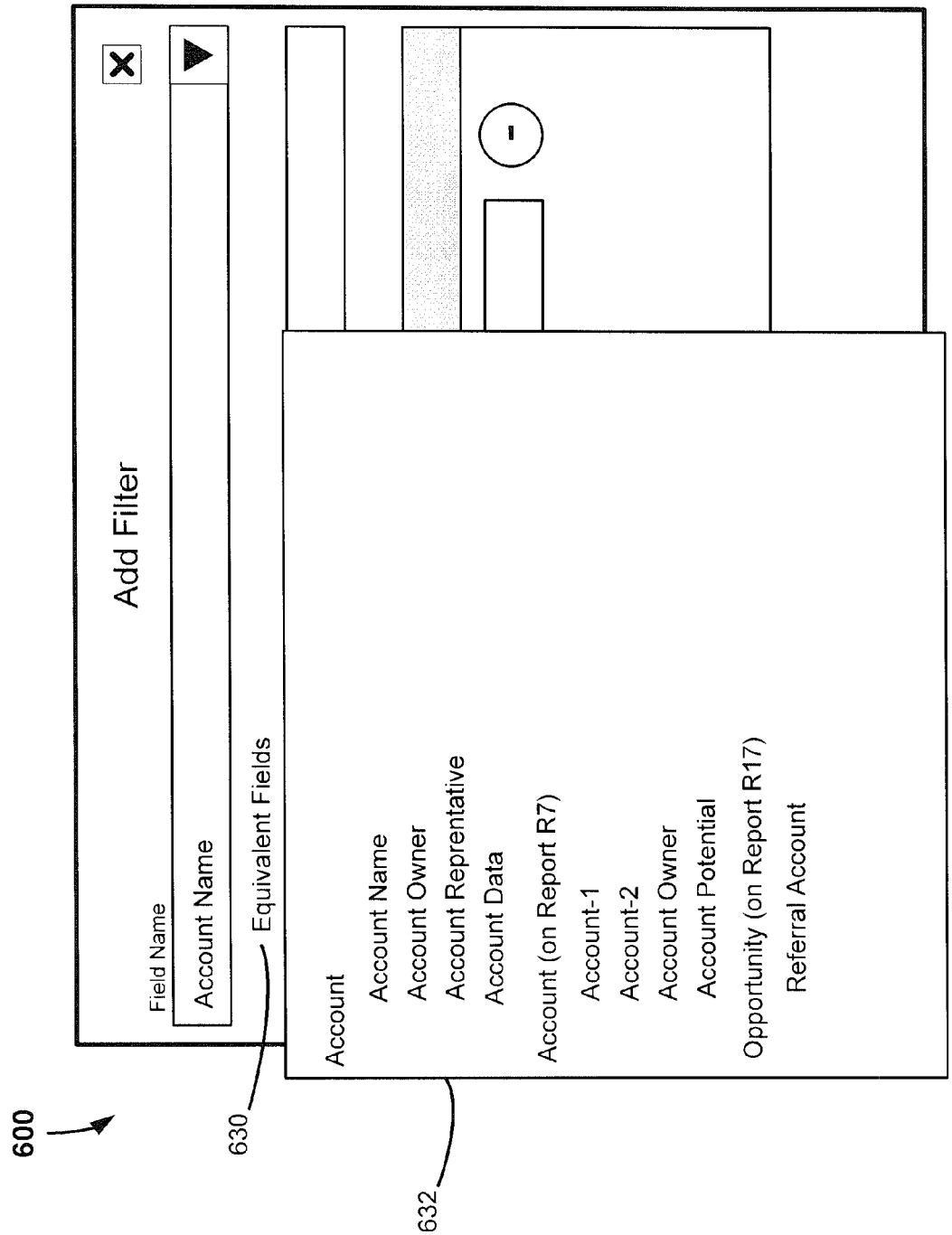
FIG. 6D shows an expanded field from the screen shot of FIG. 6C.

Upon selecting a field name, the second data field 604 displays a label corresponding to the selected field name as shown in FIG. 6C. For example, upon selecting the field name Account Name in data box 602, that same value is entered as a default value in the Display Label data box 604. Alternatively, as shown in FIG. 6D, a list of equivalent field names may be displayed in pop-up box 632 by selecting or hovering over a link 630 for equivalent fields that may be displayed below the field name data box. A conservative approach is to display all of the equivalent field names, but remove duplicate entries. However, it must be determined which fields are common or equivalent, how to label these common fields, and ultimately, how to apply the filter back to the individual components.

Returning to FIG. 6C, once the field name has been selected in data box 602, the data box 606 also becomes active, and additional options and/or criteria may be configured for the filter overlay using well known methods. In one embodiment, dashboard filters may be configured with drop-down parameter lists that allow users to select subsets of the displayed components.

5. Determining Common Fields and Equivalent Labels

Figure 7:
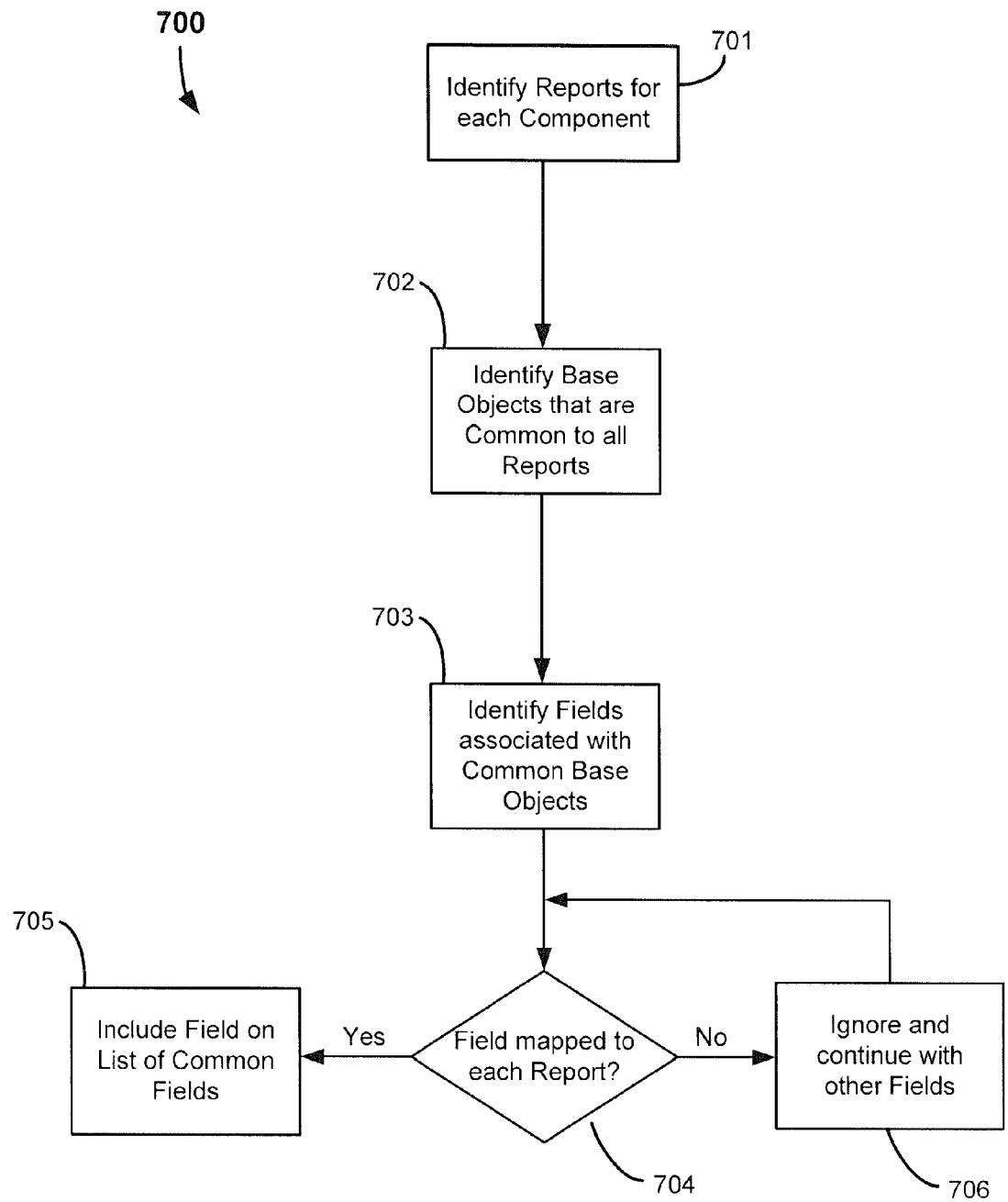
FIG. 7 is a flowchart illustrating a method for determining filter common fields.

FIG. 7 illustrates a process 700 that compiles a list of common fields to provide for display and selection by a user.

We assume that an active dashboard displays multiple components sourced from multiple reports across multiple data sets. The first step 701 is to identify reports that source data for each displayed component, and then in step 702 identify the base objects that are common to all the reports. For example, component table 420 in FIG. 4C identifies reports in column 425 that correspond to components listed in column 421. Report table 430 in FIG. 4D then identifies the underlying object in column 433 and one or more fields of the object in column 434. Step 701 would identify each report that corresponds to an active dashboard component, for example, by searching through the report listing in a component table such as table 420 for the active dashboard. Step 702 would then identify objects that are common to all reports, for example, by searching through the object listing in a report table such as table 430 for the active dashboard.

In one embodiment, the base objects in the report type join hierarchy, such as the objects listed in column 433 of report table 430, are the main field of search, but the first level lookups of these objects, such as the fields identified n column 434 of table 430, may also be included in the field of search.

In step 703, each field associated with each of the common objects is identified. In step 704, each of those fields identified in step 703 is evaluated to determine whether it is mapped to each report type represented as a component on the active dashboard. If a field is mapped to each report type, then it is included on the available list of common fields in step 705. If not, then the field is ignored in step 706 and the evaluation step 704 continues until all fields have been evaluated.

Thus, the list generated in step 705 may be stored, for example, and referenced in a dashboard table associated with the active dashboard, and used to present choices for display as described above. This process ensures that every component displayed on the active dashboard may be filtered on the common fields. Some of the common fields may have multiple mappings within each report type, but simple rules may be devised to pick a default mapping, and to change the mappings, as described further below.

Figure 8:
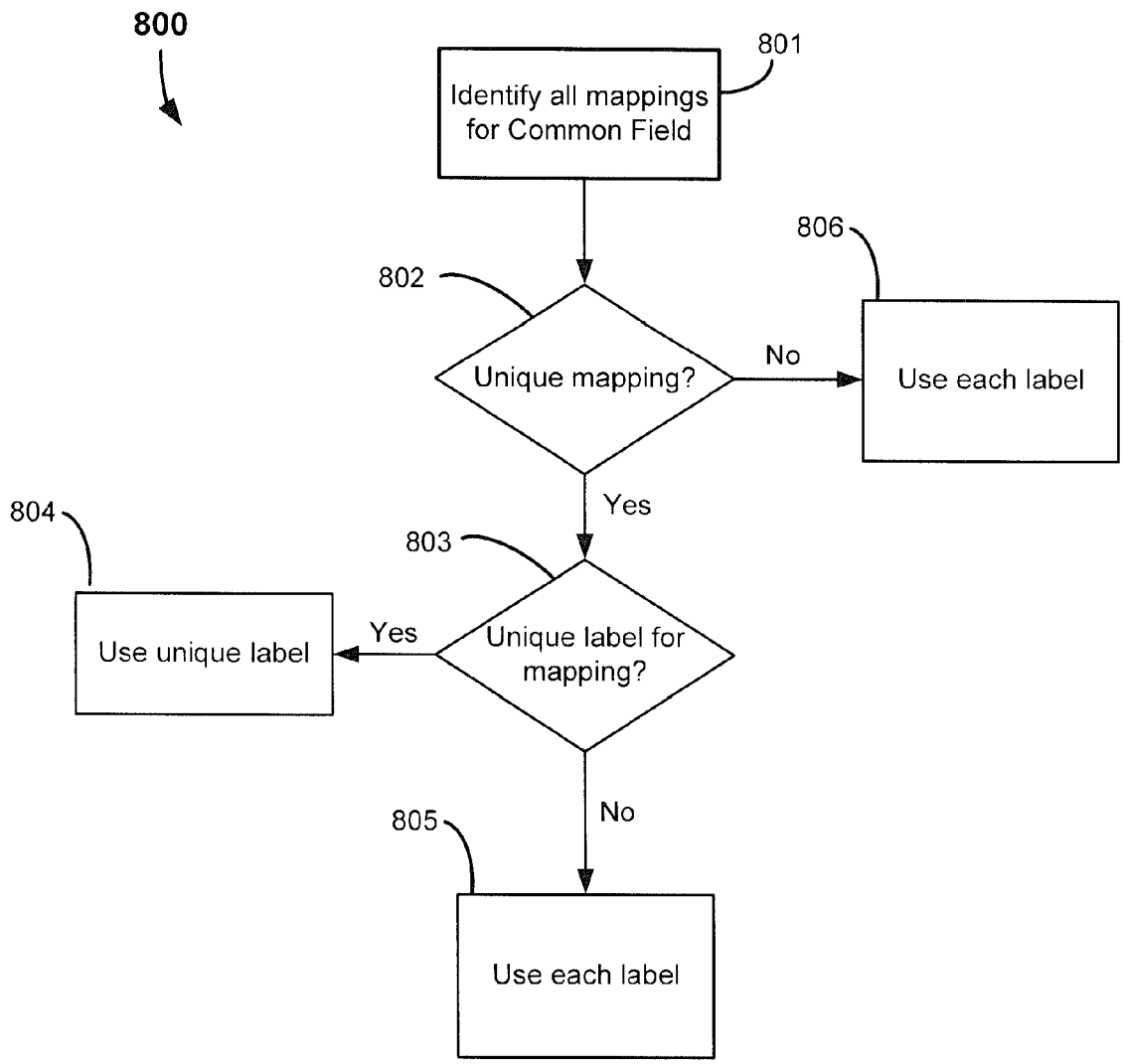
FIG. 8 is a flowchart illustrating a method for labeling filter common fields.

FIG. 8 illustrates a process 800 for determining how to label the Common Fields in the Filter overlay. In step 801, for each Common Field, all the mappings for that Common Field across all the report types are identified. In step 802, each Common Field is evaluated to determine if it has a unique mapping across all report types. If so, then in step 803, the Common Field is evaluated to determine if it has a unique label across all report types. If so, then that unique label is associated with the Common Field in step 804 and made available for display or search on the active dashboard.

If the Common Field does not have a unique label in step 803, but instead, multiple labels across report types, then each of those multiple labels will be associated with the Common Field in step 805 and used in the field name drop-down menu so that the user can make the choice.

If the Common Field does not have a unique mapping in step 802, but instead, multiple mappings across report types, then each possible label for each of the multiple mappings will be associated with the Common Field in step 806 and used in the field name drop-down menu so that the user can choose.

6. Applying the Filter

Figure 9:
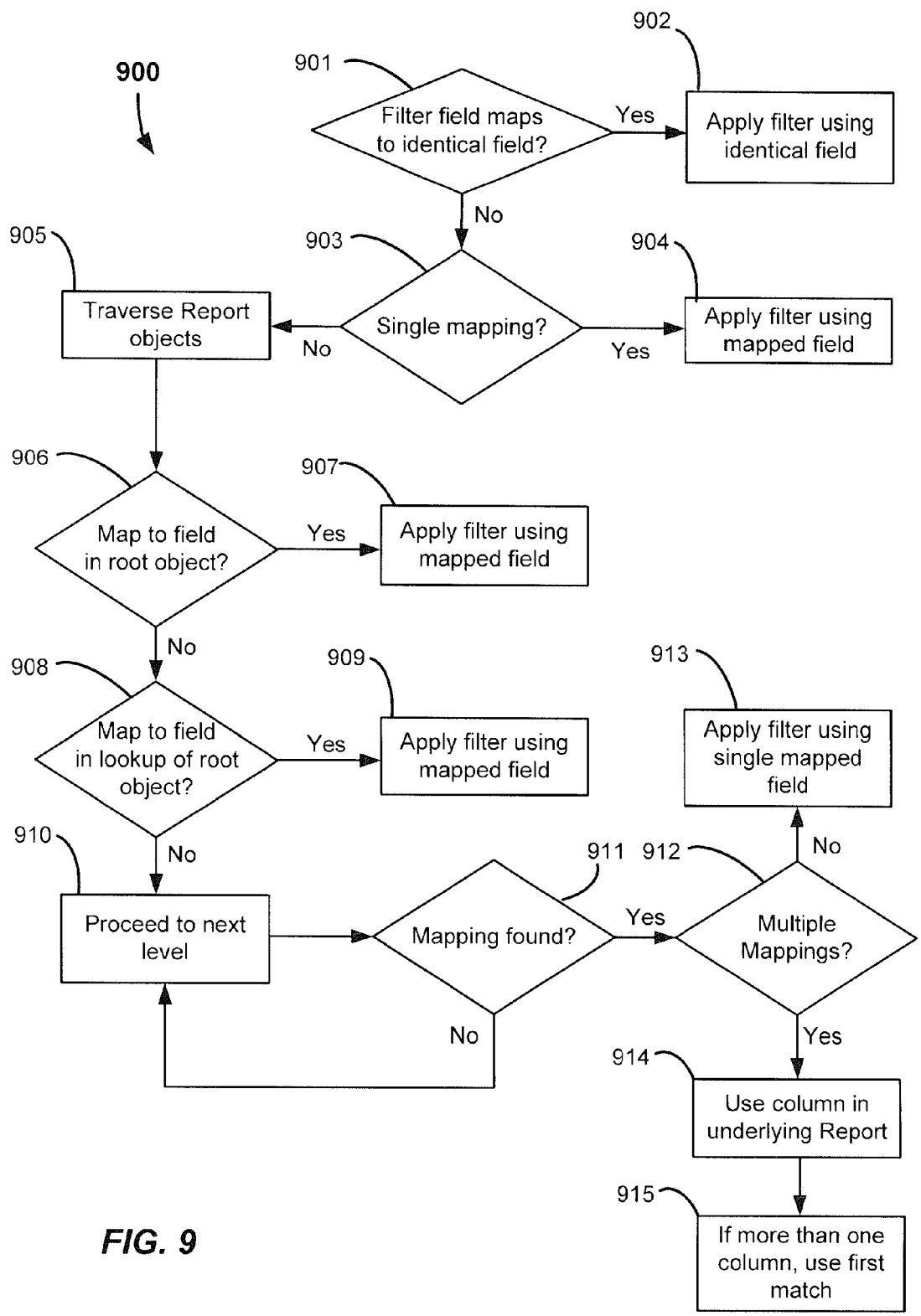
FIG. 9 is a flowchart illustrating a method for applying filter common fields.

Once the filter overlay is created (and saved), the system must determine how to apply the filter on each component of the active dashboard. FIG. 9 illustrates a process 900 to be applied for each component for determine how to apply the filter.

In step 901, the report for the component is evaluated to determine whether it has the exact same field as the selected filter field. If so, then the filter is applied to that field with no ambiguity in step 902. If there is no exact match in step 901 however, then the various possible mappings onto the report must be evaluated. As noted earlier, fields may have multiple mappings on a report and that can provide ambiguity in both configuring the filter overlay and in applying the filter.

If there is only a single mapping into a field on the report by the filter field in step 903, then the filter is applied in step 904 using that field. If there is not a single mapping in step 903, then there are possible multiple mappings. In order to resolve any ambiguities, the report is then traversed in step 905 beginning at the root object and proceeding to the bottom of the join hierarchy including lookups at each level, as necessary.

If the filter field maps to a field in the root object in step 906, then use that field to apply the filter in step 907. If not, then the next priority is to determine if the filter field maps to a field in the lookups of the root object in step 908. Since the root object may have multiple lookups, in one embodiment, they are evaluated in the order they are defined in the report. If the filter field maps to a lookup of the root object in step 908, then that field is used to apply the filter in step 909.

If the filter field does not map to the root object or its lookups, then the process proceeds down the join hierarchy to the next level in step 910 using the same logic to evaluate possible mappings of the filter field. If a mapping is not found in step 911, then the process moves to the next level in step 910 again. When a mapping is found in step 911, it must be determined whether there are multiple mappings in step 912. If not, then that mapping is used in step 913. If so, then the system will simply select the column of the report that is also used in the underlying report in step 914. If there is more than one column used in the underlying report, then the first matching column is selected in step 915.

Regardless of whether or not a mapping ambiguity exists, in one embodiment, the filter field mapping will be shown on each component. For components whose report types do have ambiguity, i.e., multiple possible mappings, users can change the filter field mapping. One consequence is that a filter field may be mapped in one component to a different column mapped in another component to a totally different column even though both the components use the same report.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for display of graphical metrics on a user interface, comprising:
    displaying, by a database system, an active graphical user interface comprising a plurality of graphical metrics of statistical data, the statistical data being from reports generated from a plurality of data fields stored in objects on a database, wherein at least some of the reports are generated from different data models, the different data models having different data fields from each other;

identifying, by the database system, an underlying report for each graphical metric displayed on the interface;

identifying, by the database system, one or more base objects common to each of the underlying reports;

identifying, by the database system, data fields in each of the one or more base objects, the data fields being present in the one or more base objects in each of the underlying reports;

adding, by the database system, the identified data fields to a list of data fields that only includes identified data fields;

receiving, by the database system, a selection of a identified data field from the list of identified data fields; and filtering, by the database system, the displayed graphical metrics on the basis of at least one data field, the at least one data field including the selected identified data field.

2. The method of claim 1, further comprising displaying, by the database system, the list of identified data fields, wherein the step of receiving, by the database system, the selection of the identified data field comprises
receiving the selection from the displayed list of identified data fields.

3. The method of claim 2, further comprising displaying a label for each identified data field.

4. The method of claim 3, further comprising displaying all labels from the different data models for each identified data field.

5. The method of claim 4, further comprising removing duplicate labels prior to displaying all labels.

6. The method of claim 1, wherein the step of receiving, by the database system, a selection of the identified data field comprises:
receiving a text query; and
searching for the text query in the list of identified data fields.

7. The method of claim 1, further comprising:
identifying one or more data fields in each report that originate from the same object;
identifying one or more data fields that map to each report; and
adding to the list of identified data fields the one or more data fields that originate from the same object.

8. The method of claim 1, wherein the step of filtering the displayed graphical metrics further comprises directly applying the identified data field to an identical field or an equivalent field in the underlying report.

9. The method of claim 1, wherein the selected identified data field has multiple mappings in the underlying report, and wherein the step of filtering the displayed graphical metrics further comprises:
traversing the report starting at the join hierarchy; and
mapping the selected identified data field to a field on the base object if applicable, and if not, then mapping the selected identified data field to a field in a lookup of the base object if applicable, and if not, then proceeding to subsequent levels of the report hierarchy to locate and select a mapping.

10. A non-transitory machine-readable medium having stored thereon one or more sequences of instructions for displaying graphical metrics on a user interface, which instructions, when executed by one or more processors, cause the one or more processors to carry out the steps of:
displaying an active graphical user interface comprising a plurality of graphical metrics of statistical data, the statistical data being from reports generated from a plurality of data fields stored in objects on a database, wherein at least some of the reports are generated from different data models, the different data models having different data fields from each other;
identifying an underlying report for each graphical metric displayed on the interface;
identifying one or more base objects common to each of the underlying reports;
identifying data fields in each of the one or more base objects, the data fields being present in the one or more base objects in each of the underlying reports;
adding the identified data fields to a list of identified data fields that only includes identified data fields;
receiving a selection of a identified data field from the list of identified data fields; and
filtering the displayed graphical metrics on the basis of at least one data field, the at least one data field including the selected identified data field.

11. The machine readable medium of claim 10, wherein the filtering step further comprises applying the identified data field to an identical field or an equivalent field in the underlying report.

12. The machine readable medium of claim 10, wherein the selected identified data field has multiple mappings in the underlying report, the step of filtering the displayed graphical metrics further comprising:
traversing the report starting at the join hierarchy; and
mapping the selected identified data field to a field on the base object if applicable, and if not, then mapping the selected identified data field to a field in a lookup of the base object if applicable, and if not, then proceeding to subsequent levels of the report hierarchy to locate and select a mapping.

13. The machine readable medium of claim 10, further comprising displaying a label for each identified data field.

14. An apparatus for displaying graphical metrics on a user interface, the apparatus comprising:
a processor; and
one or more stored sequences of instructions which, when executed by the processor, cause the processor to:
display an active graphical user interface comprising a plurality of graphical metrics of statistical data from reports generated from a plurality of data fields stored in objects on a database, wherein at least some of the reports are generated from different data models, the different data models having different data fields from each other;
identify an underlying report for each graphical metric displayed on the interface;
identify one or more base objects common to each of the underlying reports;
identify data fields in each of the one or more base objects, the data fields being present in the one or more base objects in each of the underlying reports;
add the identified data fields to a list of identified data fields that only includes identified data fields;
receive a selection of a identified data field from the list of identified data fields; and
filter the displayed graphical metrics on the basis of at least one data field, the at least one data field including the selected identified data field.

15. The apparatus of claim 14, wherein the instructions, when executed by the processor, further cause the processor to:

display the list of identified data fields, wherein the step of receiving the selection of the common data field comprises receive the selection from the displayed list of identified data fields.

16. The apparatus of claim 14, wherein the instructions, when executed by the processor, further cause the processor to:

receive a text query; and search for the text query in the list of identified data fields.

17. The apparatus of claim 14, wherein the instructions, when executed by the processor, further cause the processor to:

identify one or more data fields in each report that originate from the same object;

identify one or more data fields that map to each report; and add to the list of identified data fields the one or more data fields that originate from the same object.

* * * * *